Sept. 21, 1948.    G. F. JOHNSON    2,449,942
METHOD OF MAKING ANTIFRICTION BEARING ASSEMBLIES
Filed April 25, 1945    2 Sheets-Sheet 1
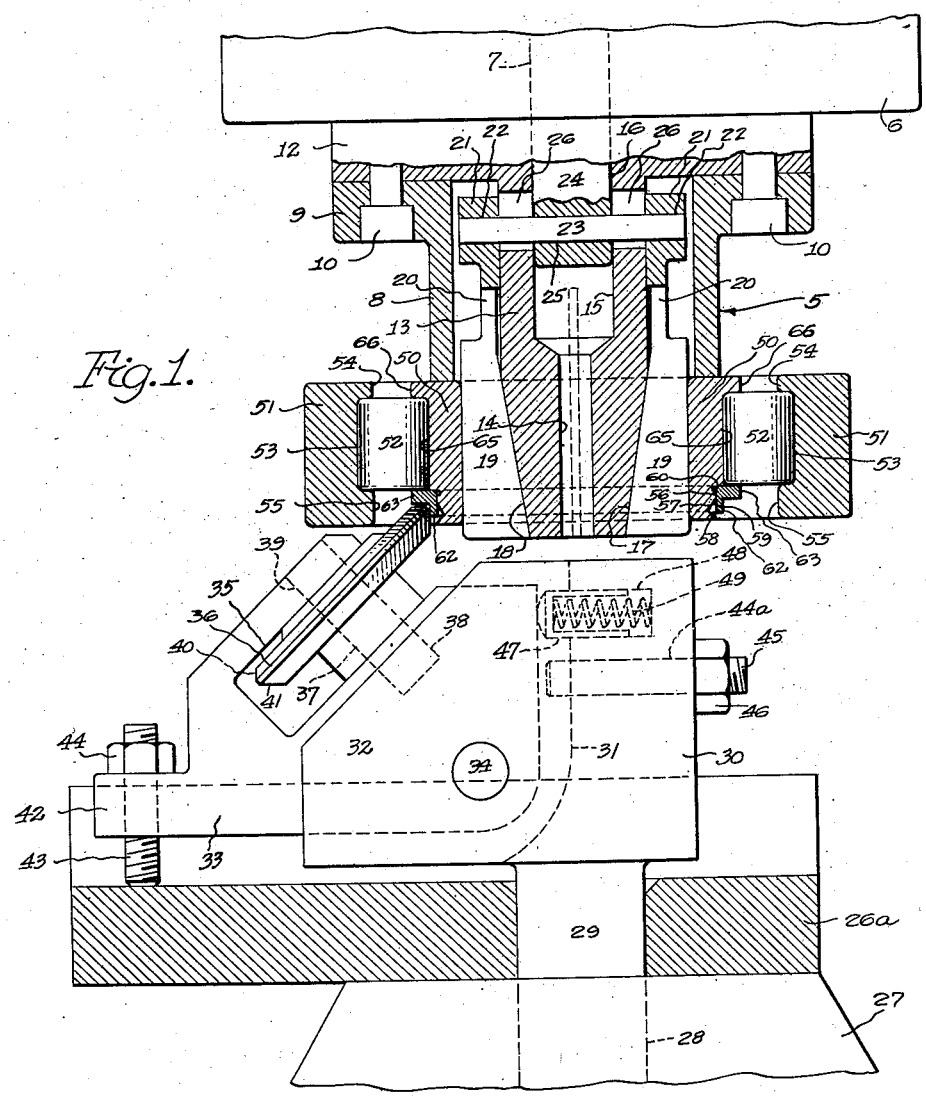
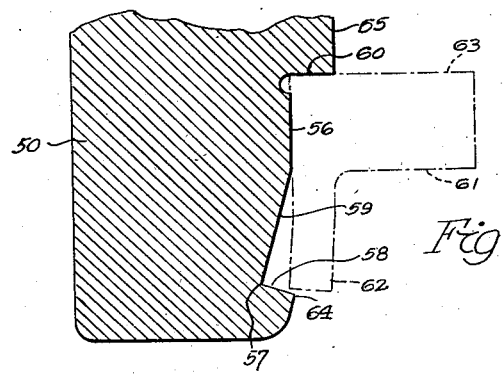
Inventor
Glen F. Johnson
By Barthel & Bugbee
Attorneys Sept. 21, 1948.  G. F. JOHNSON  2,449,942
METHOD OF MAKING ANTIFRICTION BEARING ASSEMBLIES
Filed April 25, 1945  2 Sheets-Sheet 2
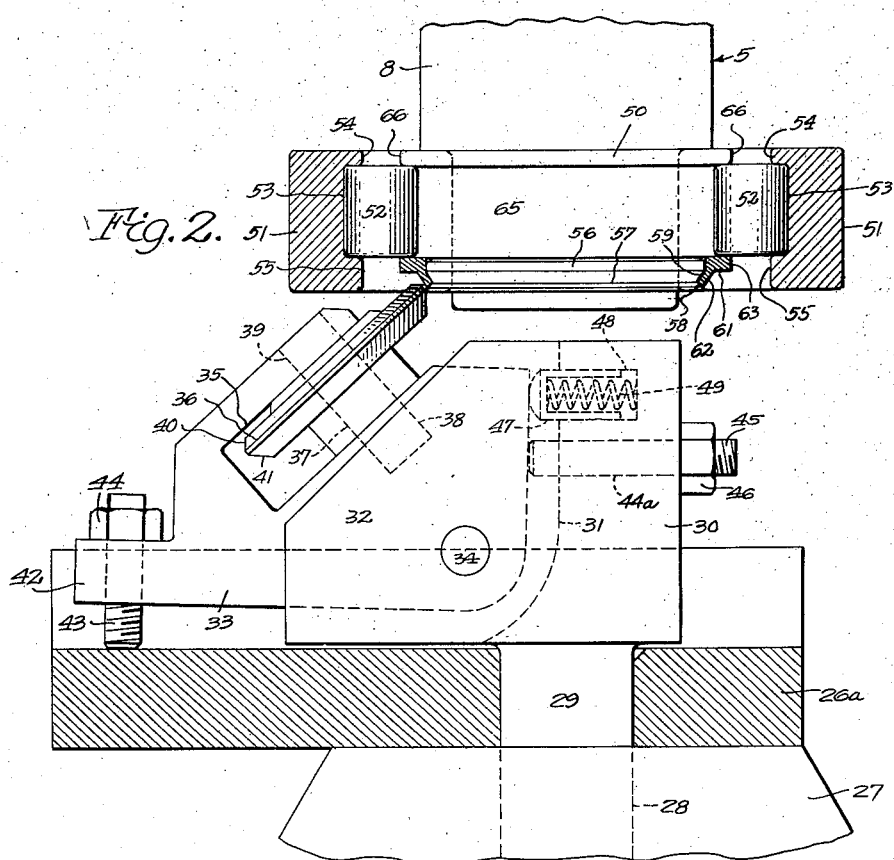
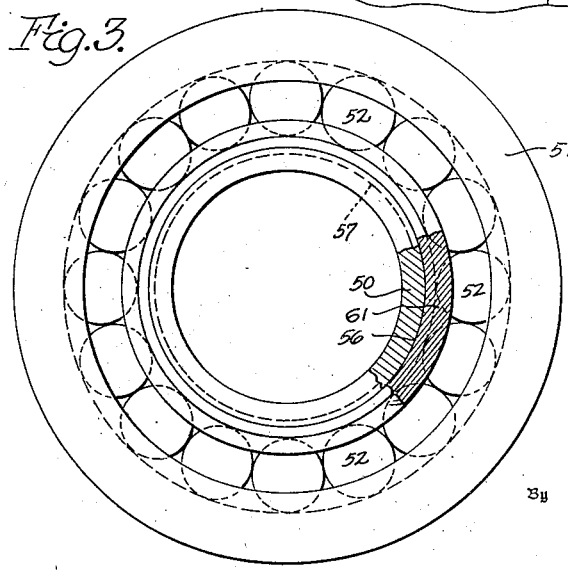
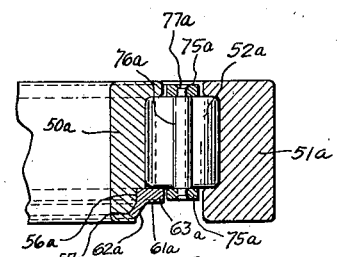
Inventor
Glen F. Johnson
Barthel & Bugbee
Attorneys Patented Sept. 21, 1948

2,449,942

UNITED STATES PATENT OFFICE 2,449,942

METHOD OF MAKING ANTIFRICTION BEARING ASSEMBLIES

Glen F. Johnson, Detroit, Mich., assignor to Bower Roller Bearing Company, Detroit, Mich., a corporation of Michigan Application April 25, 1945, Serial No. 590,282

4 Claims. (Cl. 29—148.4)

The present invention relates to anti-friction bearing assemblies and more particularly, to a method for making the same.

The primary object of the invention is to provide an anti-friction bearing assembly having one of its race members formed with a land surface and an annular recess with an inclined wall surface connecting said land surface adapted to receive a continuous locking ring, which locking ring is seated in said recess by a spinning operation.

Another object of the invention is to provide a novel and unique method for seating locking rings in the race members of anti-friction bearing assemblies by placing the bearing assembly and locking ring on a rotating support and moving a spinning and forming disc or the like under pressure into engagement with the locking ring so as to deform a portion of the ring and cause the same to be permanently set and seated in said annular recess with the remaining portion seated on said land surface.

Another object of the invention is to provide a bearing assembly in which one or both of the race members are provided with an annular land surface and an annular recess arranged in close relation for receiving a locking ring, a portion of which is adapted to fit the land surface so as to be snugly received thereon with the remaining portion formed for being spun into position in the annular recess by means of a spinning operation so that a portion of said locking ring will be permanently seated and set therein.

Another object of the invention is to provide a continuous locking ring for roller bearing assemblies and the like which is adapted to be permanently set and seated in the annular recess in one of the race members of said roller bearing assembly so as to resist axial bearing thrusts as well as retain the race members and rollers of said assembly in operative relation with respect to one another.

Another object of the invention is to provide a continuous locking ring of L-shaped cross-section which is adapted to be positioned on the land surface of the race member of an anti-friction bearing assembly so that one of the flanges of said locking ring may be snugly and tightly fixed on the land surface and the other flange spun into an annular recess or groove adjacent said land surface, whereby said last-mentioned flange will be deformed beyond its elastic limit and be permanently set or seated in said annular groove so as to resist axial bearing thrusts as well as retain the bearing unit in assembled relation.

Other objects and advantages of the invention will become apparent during the course of the following description of the accompanying drawings, wherein:

Figure 1 is a top elevational view of the spinning apparatus embodying the invention, illustrating portions thereof in section to show the manner in which an anti-friction bearing unit is supported on the rotary carrier with the continuous locking ring in position for being deformed by a movable spinning die member;

Figure 2 is a top elevational view similar to Figure 1, showing the manner in which the spinning die member is moved relative to the rotary support to deform one of the flanges of the L-shaped locking ring beyond its elastic limit so that the flange will be permanently set and seated in the annular groove or recess;

Figure 3 is a side elevational view of a roller bearing unit constructed in accordance with the present invention and showing a portion thereof broken away and in section to illustrate the manner in which the continuous locking ring is seated in the annular groove in the race member;

Figure 4 is an enlarged cross sectional view of one end of a roller bearing race member showing the manner in which the land surface and annular recess are formed therein; and Figure 5 is a diametrical cross-sectional view of a modified form of the invention showing the manner in which the continuous L-shaped locking ring is applied to one of the race members of the roller bearing unit in which the bearing rollers are spaced or separated by the pins of a bearing cage.

Detailed description of the invention

In the drawings, attention is directed to Figures 1 and 2 wherein there is shown an apparatus for spinning a locking ring on an anti-friction or roller bearing structure so as to retain the race members and bearing elements in assembled relation. Generally, the reference character 5 will be employed to designate a rotary bearing assembly carrier, while the reference character 6 will be employed to represent a movable spinning tool support which is arranged for movement to and fro with respect to the rotary carrier 5.

The rotary carrier 5 includes a rotating head 6 which, if desired, may be the rotating head of a turret screw machine or the like, having a central bore 7. The head 6 is adapted to be drivingly engaged by suitable motor means to impart rotation thereto, and affixed to one of the radial walls of the rotating head 6 is a cylindrical abutment 8 which is flanged as at 9 so as to receive machine screws 10 which have their ends anchored in the rotating head 6.

Arranged within the cylindrical abutment member 8 and formed integral with a face plate 12 likewise affixed to the rotating head 6 and held in place by machine screws or the like, is a tubular projection 13 which is provided with a bore 14 terminating at one end in an enlarged bore 15, which is in co-alignment with the bore 7 in the rotating head 6 as well as the bore 15 in the face plate 12. The free end of the tubular projection 13 is tapered as at 17 to form a frusto-conical wedge surface for being engaged by the tapered surfaces 18 of semi-circular chuck jaw members 19. The upper ends of the chuck jaw members 19 are provided with extensions 20 which terminate in bearing bosses 21 which are provided with aligned bores 22 for receiving a transversely extending pin 23. Reciprocably mounted within the bore 7 of the rotary head 6 is a shaft 24 having a bore 25 through which the pin 23 extends so that upon reciprocation of the shaft 24, the semi-circular chuck jaws 19 will be moved inwardly or outwardly, depending upon the direction of the motion of the shaft 24 so as to cause the chuck jaws 19 to be expanded or contracted. Longitudinal slots 26 are provided in the tubular projection 13 for permitting limited movement of the transverse pin 23 to grip and chuck a bearing assembly in position so that the locking ring may be operated upon by a spinning tool.

The spinning tool 26a comprises a turret head or the like 27 mounted on a longitudinally movable support (not shown) to facilitate the movement of the spinning tool toward and away from the anti-friction bearing unit carrier 5. The turret head 27 is provided with a radially extending bore 28 in which is slidably mounted a shaft 29 having formed at one end thereof a polygonal-shaped head 30, while the other end is adapted to be connected to a suitable control mechanism such as cams and the like (not shown). It will thus be seen that the turret head 27 and polygonal-shaped spinning tool carrier head 30 may be moved independently of one another toward and away from the bearing unit chucking carrier 5 by suitable means such as cams and the like which form no part of the present invention.

The polygonal-shaped spinning tool carrier head 30 is provided at one end with an inwardly extending slot 31 to provide spaced furcations 32 for receiving therebetween the frame 33 of a spinning tool. A pivot pin 34 extends through suitable openings in the furcations 32 as well as a suitable opening in the frame 33 so that the spinning tool supporting frame 33 may rock about the pin 34 as a fulcrum point.

Provided in the spinning tool supporting frame 33 is a downwardly inclined slot 35 for receiving a spinning tool, such as a disc 36 which is mounted on a supporting pin 37, the ends of which are received in suitable bearing openings 38 and 39 in the spinning tool frame 33. The peripheral portion of the spinning wheel 36 is beveled on each side of the center thereof as at 40 and 41, with the bevel surface 41 slightly larger than the surface 40 to provide a relatively wide contacting face for engaging one of the flanges of the L-section locking ring.

An extension 42 is formed on the spinning tool frame 33 for receiving an adjusting screw 43 for limiting the rocking movement of the spinning tool frame 33 about the pivot pin 34 in one direction of pivotal movement. A lock nut 44 is threaded on the adjusting screw 43 to retain the same in an adjusted position. In order to limit the rocking movement of the spinning tool frame 33, in the other direction of rocking movement, a bore 44a is formed in the polygonal-shaped head 30 for receiving a limiting screw 45 which likewise may be held in an adjusted position by means of a lock nut 46.

It is to be noted that the pivot pin 34 is offset from the axis of the rotary bearing unit chucking device or carrier 5 so that by manipulating the turret head 27 and polygonal-shaped head 30, the spinning tool carrier frame 33 may be rocked about the pivot point 34 so as to move the spinning tool 36 toward the axis of the rotary bearing unit carrier 5. In order to return the spinning tool carrier frame 33, a spring-pressed plunger 47 is mounted in a bore 48 in the polygonal-shaped head 30, which bore is in registry with the slot 31 so that the coil spring 49 therein may yieldingly urge the plunger 47 against a portion of the spinning tool frame 33 received in said slot 31 and placed in the fulcrum pin 34.

*Roller bearing and continuous locking ring*

The roller bearing structure includes an inner race member designated by the reference character 50 and an outer race member 51. A series of bearing rollers 52 are generally interposed between the inner and outer race members 50 and 51 and, as illustrated in Figures 1 and 2, the outer race member 51 is provided with an internal groove 53 forming a raceway between shoulder portions 54 and 55.

The inner race member 50 is machined to provide a raceway 65 having a shoulder 66 at one end thereof and a stepped portion at the opposite end providing a land surface 56 and an annular recess or groove 57. The annular groove 57 is formed triangular in cross-section with one wall thereof as at 58 being relatively shorter than the other wall as at 59. Thus, the land surface 56 is formed adjacent the groove 57 and between said groove and the stepped portion 60 connecting the raceway 65.

A continuous locking ring 61 which is L-shaped in section is adapted to be positioned as shown by dotted lines in Figure 4 with the flanged portion 62 of the continuous locking ring arranged for reception in the annular recess or groove 57, while the other flanged portion 63 extends radially from the land surface 56 to provide an abutment wall for the radial wall surfaces of the bearing rollers 52.

It is to be noted that the juncture of the short wall surface 58 with the curved surface of the inner race member as at 64 is of substantially the same outer diameter as the land surface 56 so as to permit the continuous locking ring 61 to be slipped over the end of the stepped portion of the inner race member so as to be received on the land surface 56 with the inner wall in abutting relation with the stepped surface 60 and the flange 62 arranged and positioned adjacent the annular recess or groove 57.

*Method of assembling the locking ring on the bearing unit*

The roller bearing unit including the inner and outer race members 50 and 51 with the bearing rollers 52 therebetween are adapted to be supported on the rotary carrier 5 after the continuous locking ring 61 has been slipped over the end of the inner race member 50 which, it is to be noted, has an inner diameter of a size to frictionally engage the land surface 56 and temporarily retain the locking ring 61 in place while the bearing unit is being clamped on the rotary carrier 5. In clamping the bearing unit in place, the reciprocating shaft 24 is moved horizontally so as to force the chuck jaws 19 outwardly with respect to the cylindrical abutment 8. Thus, the chucking jaws 19 are contracted so that the inner race member 50 may be positioned with the semi-circular chucking jaws 19 extending through the opening thereof. When the bearing unit has thus been placed on the semi-cylindrical chucking jaws 19 with the inner race member in abutment with the cylindrical abutment 8, the shaft 24 is moved in the reverse direction to expand the semi-cylindrical chucking jaws 19 into engagement with the inner race member and thereby retain the bearing assembly in position. The rotary head 6 is then connected with a source of motive power so that the bearing unit as well as the continuous locking ring 61 will be rotated about the axis of the shaft 24.

The turret head 27 and polygonal-shaped head 30 are then simultaneously moved to a position toward the carrier 5 so that the metal spinning disc 36 will be arranged with one of its beveled surfaces as at 40 in engagement with the flange 63 of the continuous locking ring while the other beveled surface as at 41 will be in engagement with the flange 52 of the continuous locking ring.

After the spinning tool or disc 36 has thus been positioned, the polygonal-shaped head 30 is locked against further movement and the turret head 27 is then moved in a direction toward the carrier 5 so that a portion of the turret head will engage the adjusting screw 43 and rock the spinning tool frame 33 on its pivot pin 34. As this occurs, the spinning disc 36 is moved toward the axis of the rotary bearing unit carrier 5 so that the beveled surface 41 of the spinning disc will spin the flange 62 of the continuous locking ring and thereby deform the same beyond its elastic limit so as to permanently set the flange 62 in the annular recess or groove 57 with a portion thereof in engagement with the wall 59 of said groove and the outer edge of said flange in abutting relationship with the short wall 58 of said groove. It is to be noted that the continuous locking ring will thus be held in position to form an abutment wall for the bearing rollers 52 with a portion thereof received on the land surface 56 and the flanged portion received in the annular recess 57.

As shown in Figure 2, the continuous locking ring 51 has been spun and deformed so as to be permanently seated in the annular groove 57 so as to retain the component parts of the bearing unit in assembled relation.

In Figure 5 there is shown a modified form of the invention, and it is to be noted that the inner race member 50a as well as the outer race member 51a are formed in identically the same manner as the bearing members shown and described in connection with the form of the invention illustrated in Figures 1 to 4 inclusive. Likewise, the continuous locking ring 61a is received in an annular groove 57a with a portion thereof seated on the land surface 56a and the remaining flange 63a extending radially from the land surface to provide an abutment wall for the bearing rollers 52a interposed between the inner and outer race members 50a and 51a. The bearing rollers 52a are adapted to be separated by a bearing cage including supporting rings 75a connected by circumferentially spaced pins 76a. The ends of the pins 76a are reduced as at 77a and extend through openings in the bearing cage ring 75a so as to be riveted or upset and locked in position.

In forming the roller bearing structure shown in Figure 5, the inner race member 50a is arranged on the carrier 5 with the semi-circular chuck jaws 19 extending through the opening of said inner race member. The chuck jaws are expanded to grip the bearing unit and the spinning tool 36 is applied to deform and set the flange 62a of the continuous locking ring 51a in the annular groove 57a. It is to be noted that although the bearing rollers are spaced by a cage, the locking ring may be applied with ease because the supporting rings 75a of the bearing cage do not interfere with the proper positioning of the spinning tool 36 or the application of pressure thereto while the bearing unit is being rapidly rotated on the bearing unit carrier 5.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. A method of making anti-friction bearing assemblies having concentrically arranged inner and outer race members with anti-friction bearing elements disposed therebetween, comprising forming the end portion of one of said race members with a land surface and an annular recess in close relation thereto, fitting said land surface with a continuous locking ring having a portion extending over said annular recess, rotating said bearing assembly and locking ring, and finally moving a spinning tool into contactual engagement with said locking ring and spinning the portion thereof extending over said recess into said recess by cold working and permanently set within the annular recess.

2. A method of making anti-friction bearing assemblies having inner and outer race members with anti-friction bearing elements arranged therebetween, comprising forming the end portion of one of said race members with a land surface and annular recess therein, fitting a locking ring of L-shaped section over said land surface so that the locking ring will be frictionally retained on said land surface with the flanged portion thereof overlying said annular recess, rotating said bearing assembly and locking ring, applying a spinning and upsetting tool to the flanged portion of said locking ring while the bearing assembly is being rotated about its axis, and finally applying pressure to said spinning tool to deform and permanently set said flanged portion within said annular recess with the remaining portion thereof projecting radially beyond the raceway surface to provide an abutment surface for the anti-friction bearing elements.

3. A method of assembling anti-friction bearing units having inner and outer race members with anti-friction bearing elements arranged therebetween, comprising machining the end portion of one of said race members to provide a land surface and an annular groove thereon, forming a continuous locking ring of a size and shape to fit snugly on said land surface with a portion thereof extending over said annular recess, rotating said bearing assembly and locking ring, applying a spinning and upsetting tool to the portion of said locking ring extending over said annular recess, and finally exerting pressure on said spinning and upsetting tool to deform said portion of the locking ring extending over the annular recess into said recess and permanently set the same within said annular recess.

4. A method of assembling anti-friction bearing units having inner and outer race members with anti-friction bearing elements arranged therebetween, comprising machining the end of one of said race members to provide a land surface and an annular groove inclined relatively to said land surface, forming a continuous locking ring of L-shaped section and of a circular size to snugly fit on the land surface with one of the flanged portions of said locking ring adapted to extend over said annular recess and the other flange extending radially to provide an abutment shoulder for the anti-friction bearing elements, rotating said bearing assembly with the locking ring in position, applying a spinning and upsetting tool to the locking ring while the bearing assembly and locking ring are being rotated, and finally exerting pressure on said spinning and upsetting tool to deform the flange of said locking ring extending over said annular flange beyond its elastic limit into said recess and permanently set the same within said annular recess in interlocking engagement therewith.

GLEN F. JOHNSON.

REFERENCES CITED

The following references are of record in the file of this patent:

UNITED STATES PATENTS

| Number | Name | Date |
|---|---|---|
| 732,849 | Haas | July 7, 1903 |
| 1,176,170 | Schatz | Mar. 21, 1916 |
| 1,617,319 | Buckwalter | Feb. 15, 1927 |
| 1,630,339 | Ganster | May 31, 1927 |
| 1,736,959 | Gibbons | Nov. 26, 1929 |
| 1,738,984 | Brown | Dec. 10, 1929 |
| 1,783,791 | Hughes | Dec. 2, 1930 |
| 1,803,966 | Gibbons | May 5, 1931 |